United States Patent

Fischer

[15] 3,646,396
[45] Feb. 29, 1972

[54] OVERLOAD PROTECTION SYSTEM FOR DC MOTORS

[72] Inventor: Vincent A. Fischer, Cook County, Ill.
[73] Assignee: Bodine Electric Company, Chicago, Ill.
[22] Filed: July 22, 1970
[21] Appl. No.: 57,180

[52] U.S. Cl............................317/13 B, 317/22, 318/473
[51] Int. Cl.........................................................H02h 7/085
[58] Field of Search..................317/22, 13 B, 13 C, 13 R; 318/473

[56] References Cited

UNITED STATES PATENTS

| 2,930,959 | 3/1960 | Slocum............................317/13 B |
| 3,482,146 | 12/1969 | McMorrow et al....................317/13 |
| 2,659,852 | 11/1953 | Trevitt...............................318/473 X |
| 3,209,206 | 9/1965 | Courtin..............................317/13 C |

*Primary Examiner*—James D. Trammell
*Attorney*—Petherbridge, O'Neill & Lindgren

[57] ABSTRACT

Apparatus for overload protection control of direct current (DC) motors wherein a heat and current responsive device is positioned in close proximity with the windings of the motor and electrically coupled to an alternating current (AC) power supply from which the motor power is derived through a suitable AC/DC converter or control. A current sensor monitors the power input to the motor to protect the motor from startup or operational overloading, and a thermal sensing device is positioned in thermal contact with the motor to protect against running overloads.

9 Claims, 3 Drawing Figures

PATENTED FEB 29 1972

3,646,396

INVENTOR.
VINCENT A. FISCHER

BY Petherbridge, O'Neill & Lindgren

ATTORNEYS.

ns
3,646,396

OVERLOAD PROTECTION SYSTEM FOR DC MOTORS

BACKGROUND OF THE INVENTION

This invention relates to motor overload protection systems and in particular to overload protection systems for directing current (DC) motors.

More specifically, this invention relates to DC motor overload protection systems monitoring both input current and temperature of the motor to prevent injury to the motor due to operational overloading or stalling, and running overloads.

In direct current motors, as is well known, the current to the field coil is relatively low and constant. However, the current provided to the armature varies approximately in direct proportion to the operational load on the motor. Therefore, since the power input to the motor must increase as the operation load and armature current increase, the power input may be utilized to sense any operational overload on the motor. Operational overload, if uncontrolled, may cause serious damage to the motor. Excessive armature current due, for example, to a stalled or locked rotor, an excessive mechanical driven load, or a functional short circuit connection from the motor winding to ground are some overload conditions which are directly related to the armature current. Another overload condition, which is not necessarily responsive to excessive winding current as are the previous overload examples occurs due to excessive winding temperature which can result from ambient environmental conditions within which the motor is operating, or, more frequently, by operating the motor for an extended period of time at a current slightly in excess of the normal operational current. The slight armature current overload is insufficient to indicate an excessive operational load, but over a period of time will cause an excessive temperature in the windings which markedly decreases the armature life or will actually burn out the armature.

Heretofore, overload protection devices (thermal protectors) which sense both current overload and temperature overload have been limited in their application to AC and low voltage DC motors—preferably less than approximately 30 volts DC.

It has been found that the opening and closing of switch contacts in a thermal protector (TP) responsive to motor current and temperature on a DC motor having a DC power supply greater than about 30 volts will effect an arc between the contacts which welds the contacts together or erodes their surface destroying the TP. The cyclic current change in an AC motor suppresses spark formation and, therefore, arcing in the TP. While thermal protectors (TP) have been successful for use with AC motors, their application to DC motors has been extremely limited, being used only on low-voltage DC motors.

Ordinary fuses have been used in an attempt to provide protection for higher voltage DC motors. However, it has been found that the fusing of high-voltage DC motors is not satisfactory due to power surges on motor startup. To overcome fuse failures due to initial startup surges, it is necessary to increase the fuse capacity which does not sufficiently protect the motor under operational loading conditions.

SUMMARY OF THE INVENTION

It is, therefore, an object of this invention to improve electric motor overload protection systems.

Another object of this invention is to protect direct current motors from current and temperature overloading.

A further object of this invention is to sense power input to a DC motor for monitoring motor loading and to sense armature temperature to protect against heat buildup.

These and other objects are attained in accordance with the present invention wherein there is provided an overload protecting system responsive to armature current and heat buildup to terminate the power supply to the armature in the event of operational overloading of the motor.

DESCRIPTION OF THE DRAWINGS

Further objects of the invention, together with additional features contributing thereto and advantages accruing therefrom will be apparent from the following description of one embodiment of the invention when read in conjunction with the accompanying drawings, wherein.

DESCRIPTION OF A PREFERRED EMBODIMENT

Figure 2:
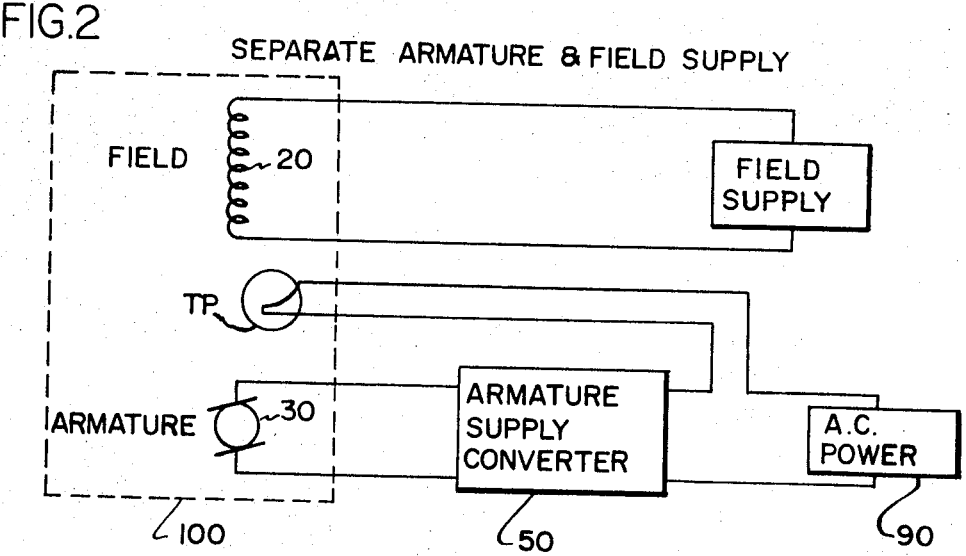
FIG. 2 is an electrical schematic of a DC motor having separate power supplies for the field current and armature current with a thermal protector connected in the armature current power supply circuit.

Referring now to FIG. 2, there is shown a schematic of a conventional direct current (DC) motor 100 having separate power supplies for the field coil 20 and armature 30. A thermal protector (TP) is carried within the motor and positioned in close proximity thermally connecting the windings 20 and 30. The thermal protector (TP) is electrically connected into the power supply circuit of the armature winding and responds to the operational loading of the DC motor as a result of the relationship between motor load and armature current.

An alternating current AC power source 90 is coupled to an AC/DC converter 50, such as a half- or full-wave rectifier, which transforms the alternating current as direct current to the armature winding. The thermal protector TP is electrically connected into the armature winding power supply on the AC side of the converter and responds to the current passing through the TP and to the temperature of the motor.

Figure 1:
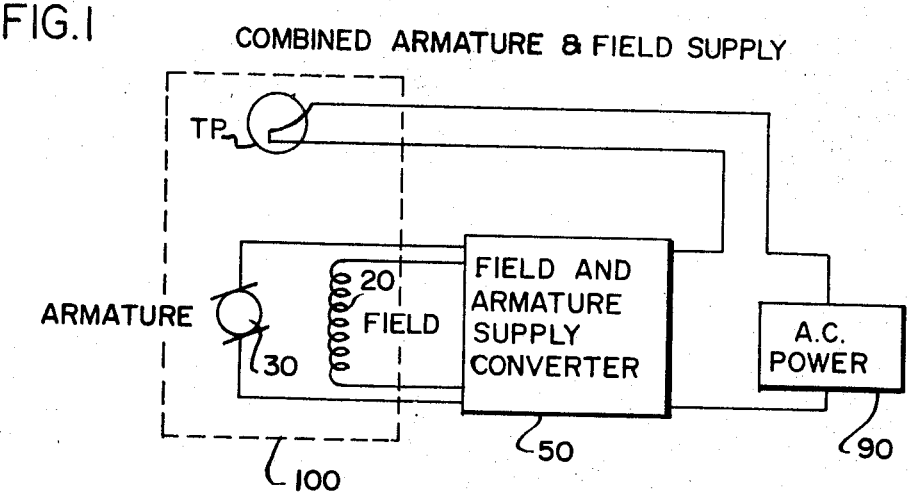
FIG. 1 is an electrical schematic of a DC motor having a common power supply for both field and armature currents and coupled to a controller for converting an alternating current power supply to direct current for motor operation.

FIG. 1 is a schematic representation of a conventional DC motor 100 having a common field and armature power supply 50, for the respective elements 20 and 30. An alternating current power source is coupled to the converter 50 on its input side and is transformed to direct current for both the field coil and armature winding. The thermal protector TP is electrically connected into the circuit as described with reference to FIG. 2 and positioned in the same manner. In this embodiment, opening of the power supply circuit by the TP will terminate current to both the armature winding and field coil.

Figure 3:
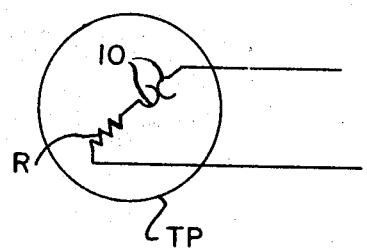
FIG. 3 is an enlarged electromechanical schematic of a typical thermal protector utilized in FIGS. 1 and 2.

A typical thermal protector TP, as best shown in FIG. 3, is electrically coupled with the AC power supply to complete the circuit to the converter 50 during normal operating conditions. A pair of electrically conductive bimetallic thermostatic elements 10, each of the bimetallic materials having a dissimilar coefficient of thermal expansion form the circuit completely contacts of the TP. Upon an increase in temperature above a certain predetermined motor operating level, the thermostatic elements 10 will expand and interrupt the electrical circuit from the AC power source. The opening of the circuit terminates the power to the converter 50 and, therefore, the armature windings, protecting the motor from overload damage. Obviously, if the motor is connected with a common field coil and an armature winding power supply both elements will be disconnected from their common power source upon a sufficient increase of temperature breaking contact between the thermostatic elements 10.

In operation, if an overload of the motor occurs such as a locked rotor or excessive mechanical driven load, the direct current drawn from the converter 50 by the armature windings increases the alternating current through the thermostatic elements 10. Stalled or locked rotor conditions result in a rapid heating of the motor winding requiring a fast response from the protector to prevent burn out. The increased current (I) may be enough to expand the elements 10 due to the heat developed as a result of their internal resistance ($I^2R$) in time, but to prevent this burnout, the temperature of the thermostatic elements is raised substantially instantaneously to the triggering level by inserting a current sensing element or resistor R in series with and adjacent to the bimetal contacts 10.

The thermostatic elements illustrated are of the automatic reset type and upon temperature decreases below the safe operating limit, will reclose again completing the circuit and supplying power to the converter and DC motor. The materials of the thermostatic contact elements 10 are selected such that their dissipation of heat is sufficiently slow to match the larger motor mass so that the thermostatic elements reclose to complete the electrical power supply circuit when the motor has cooled to the desired operating temperature. Although automatic reset thermostatic elements are preferred, a manual reset type may also be employed. As shown the current flow is through the bimetal element; however, current need not flow through the bimetal elements, but the bimetal element may be utilized to open and close a separate pair of contacts which complete the circuit to the controller and motor.

Another type of overload which occurs is not responsive to excessive armature winding current. Heat buildup, for example, may arise from operating the DC motor in ambient conditions above those limits for which the motor was designed or by operating the motor for an extended period of time to drive a mechanical load slightly in excess of the motor rating. These overload conditions do not respond to current sensors, but the increase in temperature within the motor will cause the thermostatic elements to expand and open the power supply circuit. Therefore, the thermal protector TP will prevent operational overloading through a rapid increase in the armature winding current or a gradual increase in temperature without an increase in armature current.

While the invention has been described with reference to a preferred embodiment, it will be understood by those skilled in the art that various changes may be made and equivalents may be substituted for elements thereof without departing from the scope of the invention. It is intended, therefore, that the invention not be limited to the preferred embodiment disclosed but include all such modifications and equivalents which come within the scope of the appended claims.

What is claimed is:

1. An overload protection system for precluding operational overloading of a high-voltage direct current fractional horsepower motor comprising a direct current fractional horsepower motor coupled to means for supplying direct current thereto at a voltage level exceeding approximately 30 volts, conditions responsive means carried within said motor and positioned in thermal and current sensing contact with said motor to monitor the temperature of and electrical current thereto, said condition responsive means operative between current coupling and interrupting positions in response to the temperature of and electrical current to said motor, means for supply alternating current, said direct current supplying means being electrically connected between said means for supplying alternating current and the direct current motor to convert said alternating current to direct current for operating said motor, and said condition responsive means being electrically connected between said means for supplying alternating current and said direct current supplying means to couple and interrupt the alternating current supplied thereto in response to the temperature and electrical current to said direct current motor.

2. The apparatus of claim 1 wherein said condition responsive means includes a thermostatic element.

3. The apparatus of claim 2 wherein said thermostatic element is electrically conductive.

4. The apparatus of claim 2 wherein said condition responsive means further includes a resistive element positioned adjacent said thermostatic element for dissipating heat in response to the electrical current passing therethrough.

5. The apparatus of claim 1 wherein said thermostatic elements comprise bimetallic members having a cooling rate substantially equal to the cooling rate of the motor mass.

6. The apparatus of claim 1 wherein said means for supplying direct current to said direct current motor comprises a converter for AC to DC conversion.

7. The apparatus of claim 6 wherein said converter comprises a full-wave rectifier.

8. The apparatus of claim 6 wherein said converter comprises a half-wave rectifier.

9. A method of protecting high-voltage direct current fractional horsepower motors operating at a voltage level exceeding approximately 30 volts from damage due to overloading, comprising the steps of rectifying alternating current to produce direct current at a voltage level exceeding approximately 30 volts coupling a fractional horsepower direct current motor to the direct current so produced, monitoring the temperature of and current to said direct current motor for determining an operating condition by means of a thermal responsive device positioned within said motor, interrupting the alternating current in response to the monitored conditions exceeding a predetermined operating level.

* * * * *